S. W. MARSTON.

Revolver.

No. 1,029. Reissued Aug. 21, 1860.

Inventor

Stanhope W. Marston

UNITED STATES PATENT OFFICE.

JAMES M. COOPER, OF PITTSBURG, PENNSYLVANIA, ASSIGNEE OF STANHOPE W. MARSTON.

IMPROVEMENT IN TRIGGER-OPERATING REVOLVING FIRE-ARMS.

Specification forming part of Letters Patent No. 7,887, dated January 7, 1851; Reissue No. 783, dated July 26, 1859; Reissue No. 1,029, dated August 21, 1860.

*To all whom it may concern:*

Be it known that STANHOPE W. MARSTON, of New York, in the State of New York, has invented certain new and useful Improvements in Revolving-Breech Fire-Arms; and I do hereby declare that the following is a full, clear, and exact description thereof, reference being had to the annexed drawings, forming part of this specification, in which—

Figure 1:
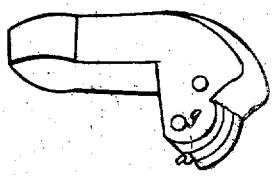
Figure 2:
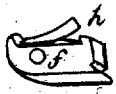
Figure 3:
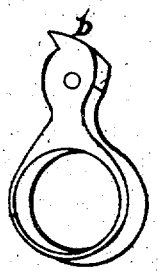
Figure 5:
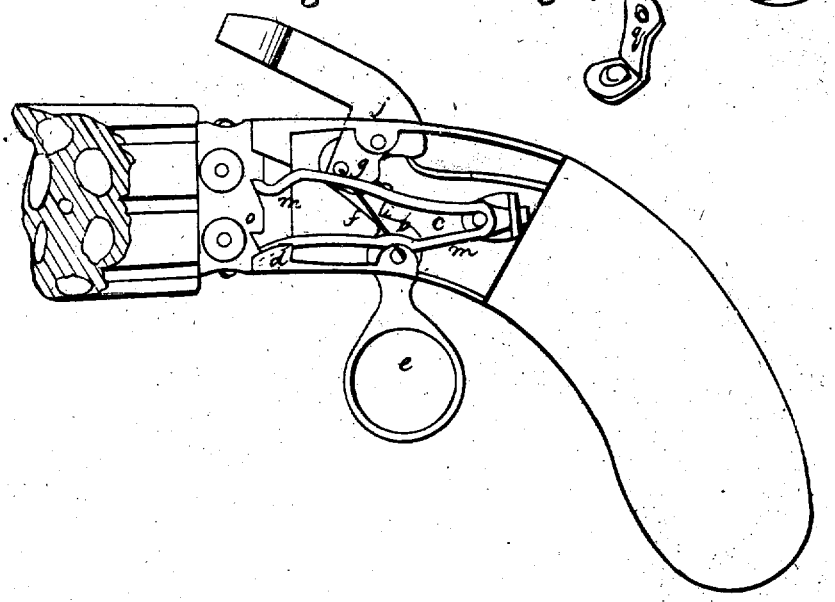
Figure 4:
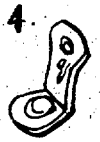

Figure 1 is a perspective view of the hammer by which the pistol is fired. Fig. 2 is a representation of the fly-tumbler or vibrating tooth detached from the hammer. Fig. 3 is a representation of the trigger, showing the shape of the sear or end of the trigger by which the fly tumbler is operated. Fig. 4 represents the spring-rest by which the spring which rotates the breech is sustained and kept in place. Fig. 5 is a side view of a revolver or pistol with revolving breech, with one side of lock-frame removed to exhibit the construction and arrangement of the parts of the lock.

STANHOPE W. MARSTON'S invention consists in certain improvements in that class of fire-arms usually called "revolvers."

These improvements are peculiarly applicable to that class or description of revolving-breech fire-arms which may be operated by trigger—that is, those in which, when the trigger is pulled, the hammer is raised and the breech sufficiently rotated for firing.

The first of these improvements is retaining the hammer at the point of full-cock in a position of unstable equilibrium by simply pulling the trigger, and without the additional aid of any pawl, catch, or similar device other than the vibrating tooth or fly-tumbler, operating as hereinafter described, and this without in any way interfering with the immediate firing of the piece by merely pulling the trigger, if it is desired to do so, without allowing it to stand at cock.

The second feature of these improvements is so constructing the lock of trigger-operating fire-arms as that while the cylinder is turned and the hammer raised to cock, the trigger shall be held back or set in a drawn position, so that when the piece is to be fired the sweep of the trigger is avoided and a mere touch is sufficient to effect the discharge.

The third improvement consists in the use of a vibrating tooth interposed between the hammer and trigger, and operating so as by an upward thrust against the hammer to cause the point of the hammer at which the pressure is applied to pass upward in front of the center of motion of the hammer, so as to increase the leverage employed to depress the mainspring, and thus, as the hammer rises, gradually weaken the effective pressure of the mainspring, so as to avoid the unsteadiness of aim caused by the force which would be otherwise required to raise the hammer to full-cock, and at the same time allow of the recovery of the trigger, after the piece has been fired, for repeated action.

In order to enable others skilled in the art to make and use these improvements, I will proceed to describe their construction and operation, premising, however, that while I describe the exact construction of the fly-tumbler or vibrating tooth, as shown in the drawings accompanying this specification, yet I do not desire to confine the invention to the exact conformation of the parts described.

In the drawing Fig. 5, A is the stock of the pistol. B is the lock-frame, to which the several parts of the lock are attached. C is the revolving breech or magazine, having any convenient number of bores *r r*, &c., to contain the charges. In the neck of this breech are the nipples or cones *s s*, &c., to receive the percussion-caps, and on the circumference of the neck of the breech, at the rear end, which enters the cavity of the lock-plate A, are as many ratchet-teeth $o\ o'\ o^2$, &c., as there are chambers in the revolving breech. The chambered breech C is connected with the lock-plate by a spindle or other suitable device in any of the ordinary modes of constructing such fire-arms.

The hammer *a* is attached to the lock-frame B by the hammer-pin *j*, the lower part of the hammer—that is, all below the hammer-pin—being placed inside of the cavity of the lock-frame. The center pin, *j*, is so situate that the head of the hammer will fall over and strike whichever of the nipples *s* may happen to be at the top of the pistol.

D is the mainspring, attached to the stock of the pistol in the usual manner, and its free end resting upon and pressing upward against the heel of the hammer, back of its center pin, *j*. The toe of the hammer extends forward below the center pin, *j*, and near the extremity of the toe is a pin-hole, *g*, (see Fig. 1,) for the pin, by which the vibrating tooth or fly-tumbler *f* is pivoted to the hammer. The toe of the hammer is slotted at *n* (see Fig. 1) from the point of the toe toward the center pin, *j*, to receive the fly-tumbler *f*. This fly-tumbler or vibrating tooth is of the shape shown in Fig. 2, having a hole, *g'*, near the front end, corresponding with the hole *g* in the toe of the hammer, to receive the tumbler-pin $g^2$, Fig. 5. The rear end of the fly-tumbler *f* is blunt and has a notch, *t*, near its lower edge to receive the point of the sear of the trigger. In front of the pin-hole *g'* the fly-tumbler is turned up at *v*, forming a projection which is designed to rest against the front edge of the hammer above the slot *n*, so as to form a knee-joint and prevent the fly-tumbler being pressed too far forward in the hammer. A fine spring, *h*, on the upper face of the fly-tumbler presses against the hammer, inside of the slot *n* under the hammer-pin *j*, and causes the fly-tumbler to react after being pressed back by the sear of the trigger, as hereinafter described. The fly-tumbler is set in the slot *n* in the toe of the hammer, and pivoted to it by a pin, *g'*, the projection *v* preventing it passing farther forward than is shown in Fig. 5, and the shape of the slot *n* in the hammer allowing it to pass backward sufficiently far to allow the trigger to regain its position after firing.

The trigger *e*, of the shape shown in Fig. 3, is attached to the lower part of the lock-frame by a trigger-pin, *x*, the center of motion *x* of the trigger being placed slightly in the rear of the center of motion $g^2$ of the hammer *a*. At the upper end of the trigger is the sear *b*, by which the fly-tumbler is operated. The sear *b* is so long or projects so far up in the lock as to strike against the blunt end of the fly-tumbler *f* when the trigger is drawn back, the fly-tumbler being pressed downward by its spring *h*. Whenever the sear of the trigger is back of the fly-tumbler, (which is its proper position before the pistol is fired,) if the trigger is drawn backward its sear will press forward against the blunt end of the fly-tumbler, and in its endeavor to pass it it will press down the end of the fly-tumbler, at the same time raising the hammer until the point of the sear of the trigger enters the notch *t* with a click perceptible to the finger of the operator, at which point the parts assume the relative position shown in Fig. 5. The hammer standing at cock and the trigger set in a drawn position, the hammer will stand cocked without any tendency to fall until the trigger is further drawn back, when the sear, slightly raising the hammer, slips out of the notch *t*, and the hammer, now having no support, falls down on the nipple of the rotating breech and fires the pistol.

The reason for the hammer standing in the position—shown in Fig. 5 at full-cock—when the trigger is pressed back into a drawn position, is that the pressure applied to the trigger by the hand of the operator has the effect to bring the point of contact of the sear *b* and the fly-tumbler *f* in front of a line drawn from the point $g^2$ (the center of the tumbler-pin) and the point *x*, (the center of the trigger,) whereas before the hammer is raised the point of contact is behind that line. Now, as soon as that point of contact falls exactly in the line between $g^2$ and *x* (as it must do before passing from behind that line to the front of it) the effective pressure of the mainspring D to cause the descent of the hammer is in the immediate line between $g^2$ and *x*, and is completely sustained by the trigger-pin *x*, so that the point of contact between the sear and the fly-tumbler has no more tendency to pass forward than backward, but is in equilibrio, and consequently the hammer will retain that position until the point of contact is thrown on either side of the line between $g^2$ and *x*, (indicated by a red line in Fig. 5.) The force of the mainspring now no longer tends to cause the descent of the hammer, but to keep the hammer and trigger at rest. The moment, however, the trigger is pressed a little farther back the sear slips forward out of the notch in the fly-tumbler, and the hammer, having no support, is forced down by the mainspring.

If, instead of firing the pistol after the hammer has been raised by the trigger to stand at full-cock, it is desired to lower the hammer without firing the pistol, this may readily be effected by pressing the trigger gently forward, which has the effect of lowering the hammer to its place so easily as not to cause the explosion of the percussion-cap on the nipple. If, however, it is desired to fire the pistol without allowing the hammer to stand at cock, it is only necessary to continue the pressure on the trigger after the click which indicates the cocking of the hammer is felt, without pausing, and the piece may be as readily and rapidly fired as though it were not so made as to stand at full-cock. By this arrangement and the use of the fly-tumbler the hammer of trigger-operating fire-arms may be raised and retained at full-cock, while the trigger remains set in a drawn position ready to be fired at the touch by simply drawing the trigger and without the use of any dog, pawl, catch, or other mechanical device to sustain the parts in the relative position of full-cock, which has, I believe, never before been accomplished by the operation of the trigger alone.

The mode of raising the hammer and firing the pistol in trigger-operating fire-arms used before this invention of the vibrating tooth or fly-tumbler by STANHOPE W. MARSTON was to place the center of motion of the trigger sufficiently in front of the toe of the hammer to allow the interposition of a connecting-link between the toe of the hammer and the point of the trigger, which was drawn forward horizontally—that is, in the line of the axis of the barrel of the fire-arm, or nearly so—by the point of the trigger, whereby the toe of the hammer, projecting below its center of motion, was drawn forward, and thus the hammer raised; but this was liable to two objections: First, it required a long sweep of the trigger, and, also, the resistance of the mainspring increased rapidly as the trigger was pulled and the connecting-link drawn forward, and this force applied to the trigger being necessarily increased until the hammer became released and the pistol fired, the sudden relaxation of the muscles of the hand of the operator at the moment of firing produced great unsteadiness of aim. These difficulties, especially the last named, are remedied entirely by the use of the vibrating tooth or fly-tumbler, so that as the hammer rises the resistance of the mainspring gradually diminishes, until at the point of full cock, attained before firing, it ceases altogether, so as to allow the hammer to stand at full-cock without other support than that of the trigger acting through the vibrating tooth on the hammer. This effect I will briefly explain.

By applying the force to raise the hammer in an upward direction more or less nearly approaching to a right angle to the axis of the barrels of the fire arm, the point $g^2$ at the toe of the hammer, to which the force is applied, is caused, in rising, to perform a part of a revolution around the point $j$, the center of motion of the hammer, and in so doing rapidly increases the horizontal distance between the point $g^2$ and a perpendicular line let fall through $j$, while the descent of the heel of the hammer brings the point on which the end of the mainspring rests nearer the perpendicular line just named. Now, it is obvious that the increase of the distance from the point $g^2$ to the perpendicular line drawn through $j$, the center of motion of the hammer, increases the leverage employed to raise the hammer, and the decrease of the distance from the perpendicular line to the point of the mainspring decreases the resistance, and thus the effective pressure of the mainspring on the heel of the hammer very rapidly lessens as the hammer is raised, while the power to raise it is multiplied without any increase of the force applied, and this effect is due entirely to the substitution of a vibrating tooth hinged or pivoted to the hammer near its toe and operated on by the trigger from a point in the rear of the center of motion of the hammer in place of the mode before in use of a link for pulling the toe of the hammer forward horizontally, which permitted only a very slight elevation of the toe of the hammer.

It is manifest that, if preferred, the vibrating tooth or fly-tumbler may be attached to the trigger and operated on the hammer instead of being attached to the hammer and operated on by the trigger.

The rotation of the breech by drawing the trigger is accomplished in the manner which I shall now proceed to describe, but may be effected by any other means.

A bent spring, $m$, Fig. 5, is set in the cavity of the lock-frame, having the extremity of its lower leg fixed in a suitable hole at $d$ in the lock-frame, near the neck of the breech. The lower leg of the spring $m$ passes to one side of the sear $b$ of the trigger, thus steadying the motion of the trigger. The rear end of the spring $m$ at the junction of its two legs is attached to a spring-rest, $l$, of the shape shown in Fig. 4, by entering a hole, $q$, in the spring-rest, and thus the spring $m$ is kept in place and pressed forward toward the rotating breech. The upper leg of the spring $m$ passes under and presses up against the pin $g^2$ of the fly-tumbler, which projects sidewise from the fly-tumbler for that purpose, and the forward end of the upper leg of the spring $m$ engages and presses up against one of the ratchet-teeth, $o'$, on the neck of the chambered breech. Now, as the hammer is raised the point $g^2$ at the toe of the hammer rises, (the hammer turning on the pin $j$ as its center,) and the projecting pin $g^2$ no longer pressing down the spring $m$, it expands, which, as its lower leg is fixed at $d$, causes the extremity of the upper leg to press upward against the ratchet-tooth $o'$, and thus rotate the breech the requisite distance to bring the next charge-chamber in line with the bore of the barrel and its nipple in range with the hammer. As the hammer falls to fire the pistol the projecting pin $g^2$ is lowered and depresses the leg of the spring $m$ on which it rests sufficiently to cause the extremity of the spring to slide down the inclined face of the ratchet-tooth $o^2$, and pass under and engage the tooth $o^2$, the spring-rest $l$ allowing the retrocession of the spring $m$ sufficiently for its end to pass over the point of the ratchet-tooth, and then pressing it forward so as to engage the tooth. The spring $m$ is again in position to effect another partial revolution of the breech when the hammer is raised, as before explained. Thus by the drawing of the trigger the breech is rotated, and the hammer is not only raised, but is held at full-cock, while the trigger is set in a drawn position; or, if preferred, the pistol may be fired at once without standing at cock.

Having thus described STANHOPE W. MARSTON'S improvement in revolving fire-arms, I do not claim rotating the breech and firing the pistol by simply pulling the trigger; but

What I do claim as his invention, and desire to secure by Letters Patent, is—

1. So constructing the lock of revolving-breech fire-arms which may be operated by trigger as that the hammer when raised to full-cock preparatory to firing may be retained in that position of unstable equilibrium until the piece is fired on a further pressure on the trigger by means of a vibrating tooth or fly-tumbler, independently of any dog, pawl, catch, or other mechanical device for that purpose.

2. So constructing and arranging the lock of revolving-breech fire-arms susceptible of operation by trigger as that when the hammer is raised to cock preparatory to firing, the trigger shall be held back or retained in a drawn position by means of a vibrating tooth or fly-tumbler.

3. The use, in revolving-breech fire-arms, of a vibrating tooth or fly-tumbler interposed between the hammer and trigger, and operating, substantially as hereinbefore described, by an upward pressure on the hammer, so as gradually to increase the leverage and consequently the power applied to raise the hammer, and thereby reduce the effective resistance of the mainspring for the purpose of securing steadiness of aim and greater ease in firing, and also to allow the recovery of the trigger after firing for repeated action.

JAMES M. COOPER.

Witnesses:
J. MASLIN COOPER,
H. C. HOLTZMAN.